(12) United States Patent
Zhang (10) Patent No.: US 11,346,265 B2
(45) Date of Patent: May 31, 2022

(54) METHODS AND SYSTEMS FOR AN ENGINE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/086,095

(22) Filed: Oct. 30, 2020

(65) Prior Publication Data

US 2022/0136420 A1 May 5, 2022

(51) Int. Cl.
*F01N 3/22* (2006.01)
*F01N 3/20* (2006.01)

(52) U.S. Cl.
CPC .......... *F01N 3/2013* (2013.01); *F01N 3/225* (2013.01); *F01N 2240/16* (2013.01); *F01N 2390/02* (2013.01); *F01N 2900/1602* (2013.01)

(58) Field of Classification Search
CPC ...... F01N 3/2013; F01N 3/2026; F01N 3/225; F01N 2240/16; F02N 2200/026; F02M 26/01
See application file for complete search history.

(56) References Cited

U.S. PATENT DOCUMENTS

| | | | |
|---|---|---|---|
| 7,373,923 B2 | 5/2008 | Trask et al. | |
| 2008/0060611 A1 | 3/2008 | Trask et al. | |
| 2011/0283675 A1* | 11/2011 | Gonze | F01N 3/22 |
| | | | 60/274 |
| 2020/0102925 A1* | 4/2020 | Christi | B60W 10/02 |

FOREIGN PATENT DOCUMENTS

| | | | | |
|---|---|---|---|---|
| DE | 102016225050 A1 | * | 6/2018 | ............ F02D 13/02 |
| EP | 2563633 B1 | * | 7/2014 | ............ B60K 6/445 |
| GB | 2581774 A | * | 9/2020 | ........... F01N 3/2013 |
| JP | 2008239078 A | * | 10/2008 | ............ B60W 20/15 |
| JP | 2017155707 A | * | 9/2017 | ............... F01N 3/30 |

OTHER PUBLICATIONS

Machine translation of DE-102016225050-A1 accessed Jul. 28, 2021. (Year: 2021).*

* cited by examiner

*Primary Examiner* — Jonathan R Matthias
(74) *Attorney, Agent, or Firm* — Geoffrey Brumbaugh; McCoy Russell LLP (57) ABSTRACT

Methods and systems are provided for an engine of a vehicle. In one example, a method includes activating a heater in response to an engine start request when a catalyst temperature is less than a threshold temperature.

15 Claims, 5 Drawing Sheets

METHODS AND SYSTEMS FOR AN ENGINE

FIELD

The present description relates generally to methods and systems for an engine during a cold-start.

BACKGROUND/SUMMARY

Emissions regulations continue to become increasingly stringent in an effort to curb human contributions to global warming. For vehicles comprising an internal combustion engine, a large source of emissions includes cold-starts where an engine operating temperature is less than a desired temperature. During the cold-start, hydrocarbon emissions may be elevated due to poor evaporation, fuel film formation, and insufficient time for the liquid film to evaporate during intake and compression strokes. The film may evaporate during an exhaust stroke, resulting in high hydrocarbon emissions to an exhaust system where catalysts may not yet be lit-off to oxidize the hydrocarbons.

Other examples of addressing hydrocarbon emissions include electric heaters and complex coolant arrangements. However, these arrangements may increase manufacturing costs while also demanding pumps and valves to operate based on complex methods. Additionally, while heating the catalysts in the exhaust passage with an electric heater allows oxidation of the hydrocarbons, the issue with reduced hydrocarbon combustion is not cured, resulting in increased fuel consumption during the cold-start due to the engine still combusting prior to the catalyst reaching a light-off temperature.

In one example, the issues described above may be addressed by a method comprising pumping heated air between a first catalyst and a second catalyst in response to an engine start request. In this way, the catalysts and the engine are heated more quickly.

As one example, a temperature of the first catalyst is less than a light-off temperature when the engine start is requested. Air in an exhaust system may be heated via an electric heater arranged between the first catalyst and the second catalyst to decrease a cold-start duration. The air is pumped via cranking of the engine while intake and exhaust valves of the engine are open to oscillate air in the intake and exhaust systems. The engine is unfueled during this time, thereby delaying emission production until the first catalyst is lit-off.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
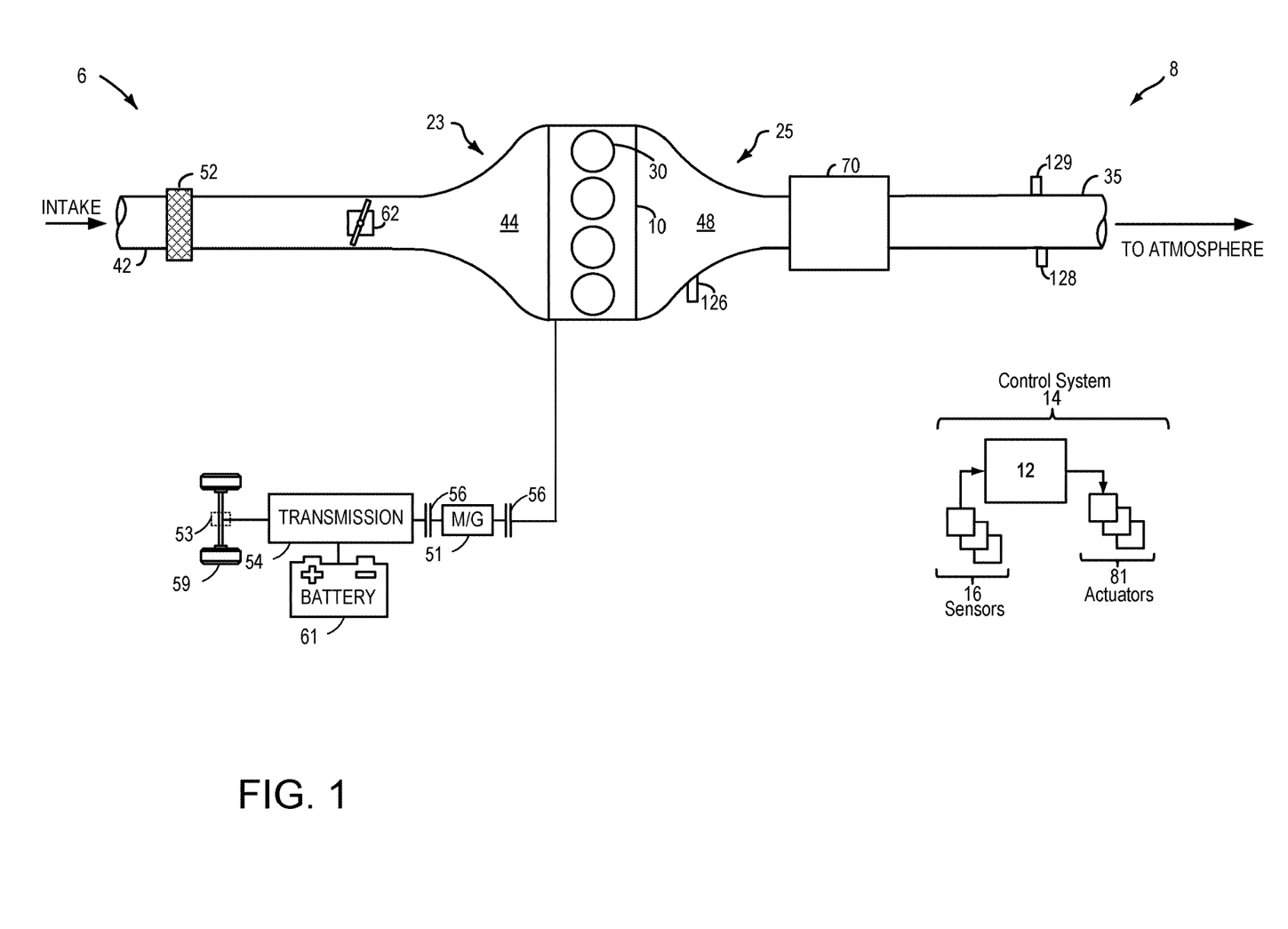
FIG. 1 illustrates a schematic of an engine included in a hybrid vehicle.
Figure 2:
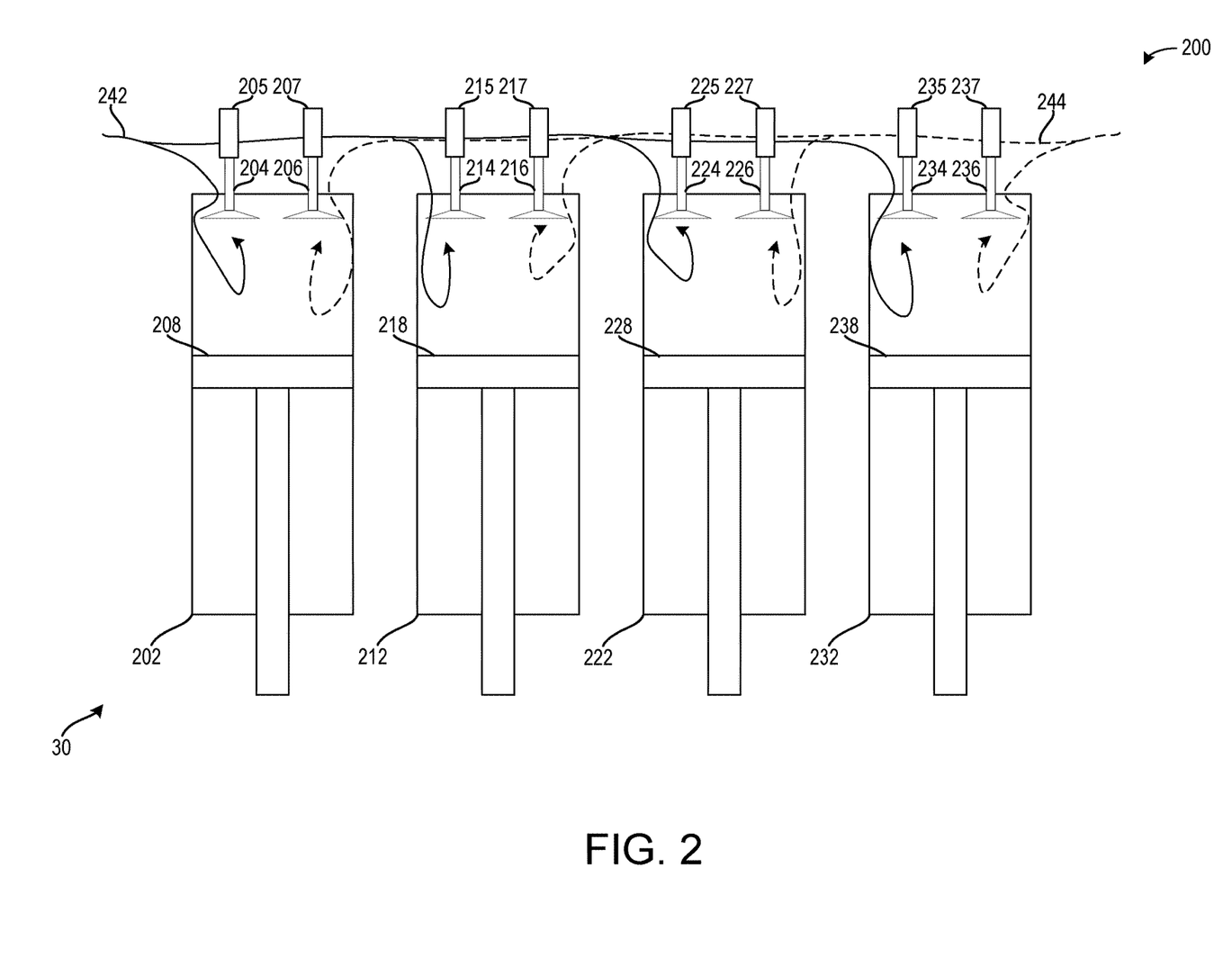
FIG. 2 illustrates an example operation of a plurality of cylinder during an engine start request.
Figure 3A:
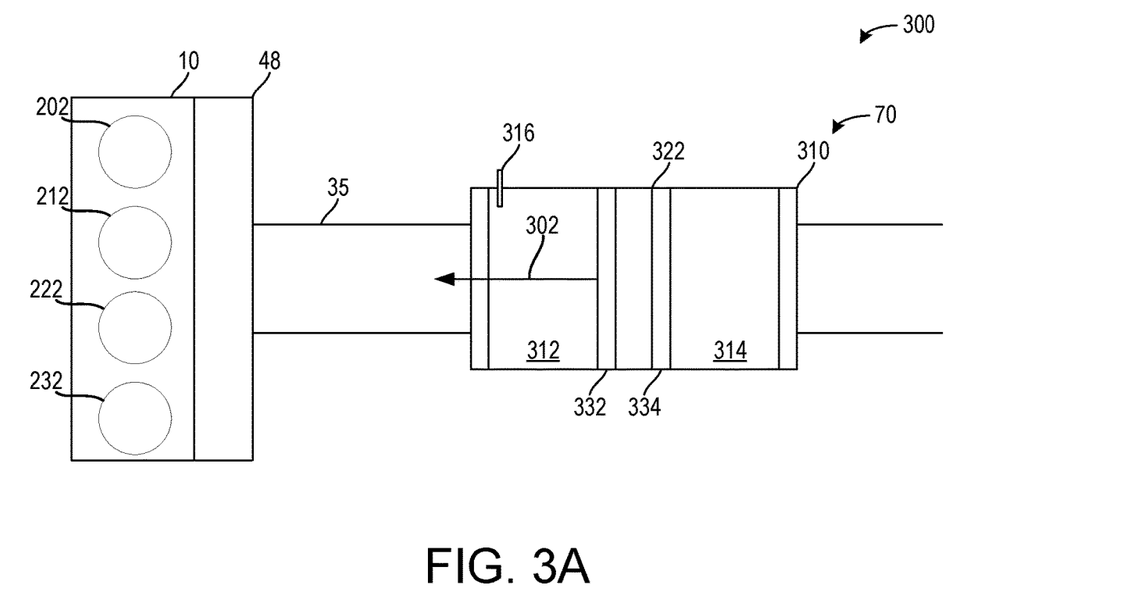
FIGS. 3A and 3B illustrate an example air flow through an aftertreatment device during the engine start request.
Figure 3B:
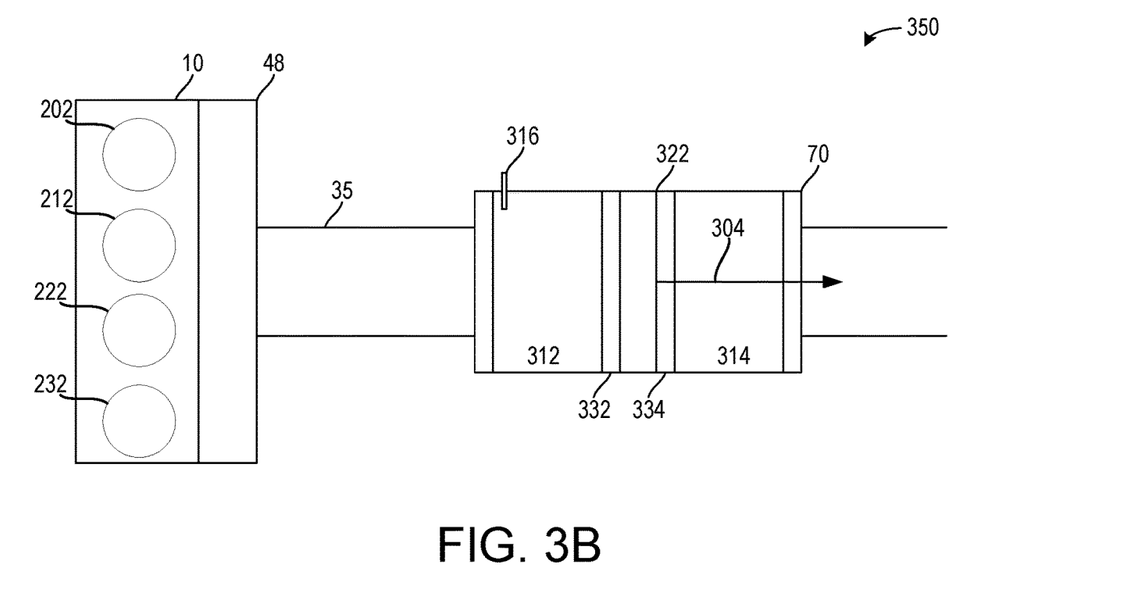
Figure 4:
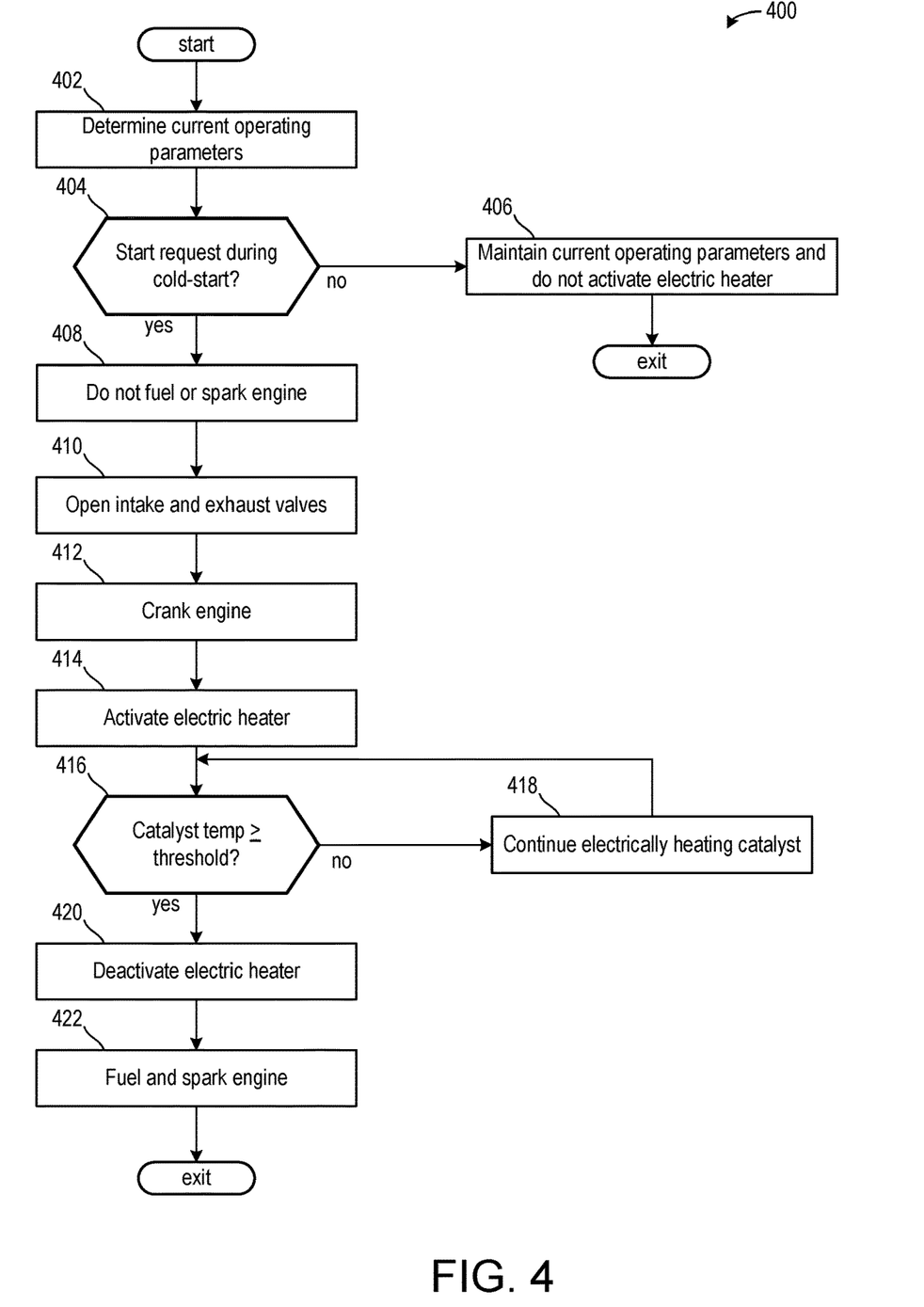
FIG. 4 illustrates a method for executing an engine start in response to an engine start request when a catalyst temperature is less than a threshold temperature.
Figure 5:
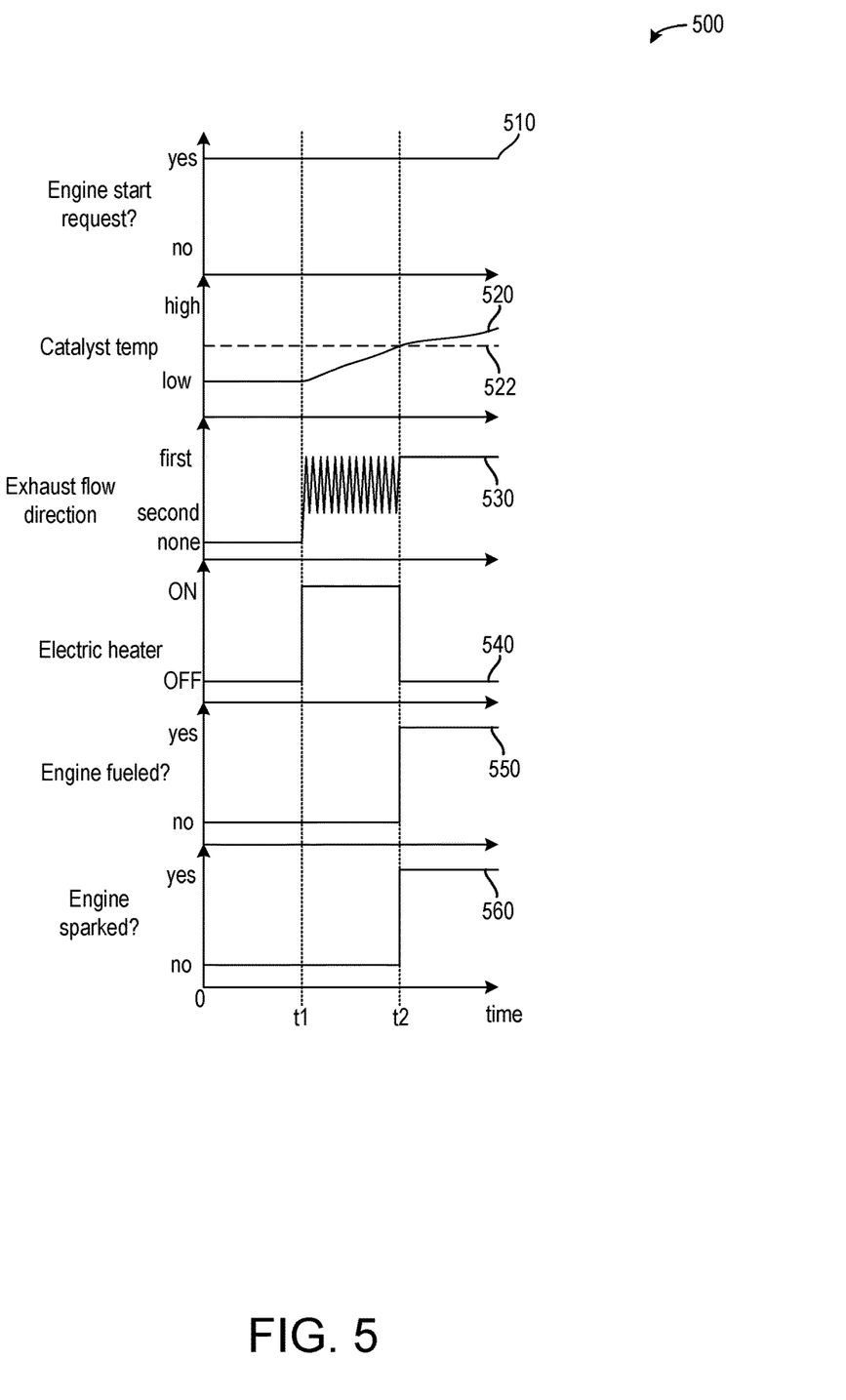
FIG. 5 illustrates an example engine operating sequence illustrating engine conditions in response to an engine start request when a catalyst temperature is less than a light-off temperature.

The following description relates to systems and methods for an engine. In one example, the engine is an engine of a hybrid vehicle, as illustrated in FIG. 1. An exhaust system of the engine may comprise an electric heater positioned adjacent to a catalyst. The engine may be operated during certain conditions to pump gases back and forth through the catalyst and the electric heater to heat the catalyst more quickly. An example of the gases flowing through the heater and the catalyst is illustrated in FIGS. 3A and 3B. To pump the gases, the engine may be cranked while unfueled. Intake and exhaust valves of the engine may be opened to reduce pumping losses while displacing gases in the intake and exhaust systems, as shown in FIG. 2. A method for operating the engine in response to a start request during cold-start conditions is illustrated in FIG. 4. FIG. 5 illustrates an example engine operating sequence illustrating engine conditions in response to an engine start request when a catalyst temperature is less than a light-off temperature.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. As shown, a drive axle 53 may be used to transfer power from the transmission 54 to the wheels 59, in one example. The drive axle 53 is a rear axle, in one example. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Turning now to FIG. 2, it shows an embodiment 200 of the plurality of cylinders 30 being operated during a cold-start. As such, the plurality of cylinders 30 are used in engine 10 of FIG. 1. Components previously introduced are similarly numbered in this figure and subsequent figures.

The plurality of cylinders 30 comprises four cylinders in the example of FIG. 2. However, it will be appreciated that more than four or fewer than four cylinders may be used without departing from the scope of the present disclosure. The plurality of cylinders 30 comprises a first cylinder 202, a second cylinder 212, a third cylinder 222, and a fourth cylinder 232. In the example of FIG. 2, each of the plurality of cylinders 30 is identical.

The first cylinder 202 comprises an intake valve 204, an exhaust valve 206, and a piston 208. The intake valve 204 may be actuated via an intake actuator 205 and the exhaust valve 206 may be actuated via an exhaust actuator 207. In one example, the intake actuator 205 and the exhaust actuator 207 may be hydraulic lash adjusters or other similar types of valve adjusters that may adjust positions of the intake and exhaust valve to fully closed positions, fully open positions (e.g., as illustrated in FIG. 2), and positions therebetween.

The second cylinder 212 comprises an intake valve 214, an exhaust valve 216, and a piston 218. The intake valve 214 may be actuated via an intake actuator 215 and the exhaust valve 216 may be actuated via an exhaust actuator 217. In one example, the intake actuator 215 and the exhaust actuator 217 may be a type of adjuster similar to the intake actuator 205 and exhaust actuator 207.

The third cylinder 222 comprises an intake valve 224, an exhaust valve 226, and a piston 228. The intake valve 224 may be actuated via an intake actuator 225 and the exhaust valve 226 may be actuated via an exhaust actuator 227. In one example, the intake actuator 225 and the exhaust actuator 227 may be a type of adjuster similar to the intake actuator 205 and the exhaust actuator 207.

The fourth cylinder 232 comprises an intake valve 234, an exhaust valve 236, and a piston 238. The intake valve 234 may be actuated via an intake actuator 235 and the exhaust valve 236 may be actuated via an exhaust actuator 237. In one example, the intake actuator 235 and the exhaust actuator 237 may be a type of adjuster similar to the intake actuator 205 and the exhaust actuator 207.

In the example of FIG. 2, the intake valves and the exhaust valves of each engine cylinder of the plurality of cylinders are illustrated in fully open positions. In one example, the operation illustrated in FIG. 2 occurs during an engine cold-start. In response to a start-request occurring while an engine temperature corresponds to a cold-start, the controller may signal to block fueling to the plurality of cylinders 30. The controller may then signal to a starter motor or other device to crank the plurality of cylinders 30 such that intake gases 242 and exhaust gases 244 may flow therein. More specifically, the pistons may pump intake and exhaust gases entering the combustion chambers of the cylinders. The pumping may generate an oscillating motion of intake gases in the intake system and exhaust gases in the exhaust system.

An electric heater may be arranged in an aftertreatment housing, as illustrated in the embodiment of FIGS. 3A and 3B, wherein the electric heater is arranged between a first catalyst and a second catalyst. As the engine cranks during the cold-start, exhaust gases may flow back and forth between the first catalyst and the second catalyst. As such, exhaust gases may flow across the electric heater as it oscillates between the first catalyst and the second catalyst. By doing this, a light-off temperature of the first catalyst and the second catalyst may be quickly reached, thereby decreasing emissions and fuel consumption.

Turning now to FIGS. 3A and 3B, they show embodiments 300 and 350 illustrating exhaust gas flow through the aftertreatment device 70 of the engine 10 during a cold-start, respectively. As illustrated, exhaust gas flows in a first direction 302 in the aftertreatment device 70 in the embodiment 300 and in a second direction 304, opposite the first direction 302, in the embodiment 350.

The aftertreatment device 70 comprises a first catalyst 312 and a second catalyst 314. The first catalyst 312 and the second catalyst 314 may be arranged within a single housing 310 of the aftertreatment device 70. In one example, the first catalyst 312 is arranged upstream of the second catalyst 314 relative to a direction of exhaust gas flow from the engine 10 to the aftertreatment device 70.

The first catalyst 312 and the second catalyst 314 may be identical in size, shape, and composition. In one example, the first catalyst 312 and the second catalyst 314 are an oxidation catalyst or other catalyst configured to oxidize hydrocarbons. In some examples, additionally or alternatively, the first catalyst 312 and/or the second catalyst 314 may comprise a particulate filter.

An electric heater 322 is arranged within the housing 310 between the first catalyst 312 and the second catalyst 314. A first gap 332 is arranged between the electric heater 322 and the first catalyst 312. A second gap 334 is arranged between the electric heater 322 and the second catalyst 314. The first gap 332 may be identical in size to the second gap 334. Additionally or alternatively, a size of the first gap 332 may be greater than or less than a size of the second gap 334.

In one embodiment, electric power is used to crank the engine until it reaches a threshold revolution per minute. The threshold revolution per minute may be greater than 1,000. In one example, the threshold revolution per minute is 1,250. The intake and exhaust valves are opened in the plurality of cylinders to decrease pumping losses in the engine. During the cold-start when the engine is being cranked, spark and fuel injections are blocked, thereby preventing combustion. Intake gases flowing into the cylinders flow back to the intake manifold and exhaust gases flowing into the cylinders flow back to the exhaust manifold 48. As such, oscillating flow patterns occur in both the intake and exhaust systems.

The vehicle, which may be configured as a hybrid electric vehicle and/or a plug-in hybrid electric vehicle, comprises the first catalyst 312 (e.g., an upstream catalyst) and the second catalyst 314 (e.g., a downstream catalyst) configured to reduce hydrocarbons, carbon monoxide, and $NO_x$ emissions. Substrates of the catalysts may treat a majority of emissions upon reaching a light-off temperature. In one example, the light-off temperature may be greater than 200° C. In one example, the light-off temperature is equal to 300° C. The electric heater 322 is configured to accelerate a heating of the first catalyst 312 and the second catalyst 314 during the cold-start. A temperature sensor 316, which is arranged within the first catalyst 312, is configured to determine a temperature of the first catalyst 312. In one example, the temperature sensor 316 is arranged adjacent to an upstream surface of the first catalyst 312. In one example, the temperature sensor 316 is a high-temperature infrared sensor.

The electric heater 322 may be heated to an upper temperature (e.g., 1200° C.). In one example, a temperature of the electric heater 322 may be adjusted based on a difference between a current first catalyst temperature and the light-off temperature. As the difference increases, the temperature of the electric heater 322 may also increase. As the difference decreases, the temperature of the electric heater 322 may also decrease, which may decrease a charge consumption of the battery. By adjusting the temperature of the electric heater 322, a temperature of the exhaust gases may also be adjusted.

The exhaust gases flow across the electric heater 322, through the first catalyst 312, and into the exhaust manifold 48, thereby heating the exhaust system. During a subsequent stroke, the exhaust gases may be pushed from the exhaust manifold 48, through the first catalyst 312, through the electric heater 322, and into the second catalyst 314. The exhaust gases may continue to flow in this pattern until the first catalyst 312 is lit-off and the engine begins receiving fuel and spark. In some examples, a compression ratio of the engine may be adjusted to adjust a flow pattern of the exhaust gases. For example, the compression ratio may be decreased to shorten a piston stroke length, which may decrease an exhaust gas displacement volume. As such, the exhaust gases may be configured to oscillate only between the first catalyst 312 and the second catalyst 314 without reaching the exhaust manifold 48.

Turning now to FIG. 4, it shows a method 400 for operating the electric heater and engine during a cold-start. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 400 begins at 402, which includes determining, estimating, and/or measuring current operating parameters. Current engine operating parameters may include but are not limited to one or more of a manifold pressure, a throttle position, an engine temperature, an engine speed, a vehicle speed, and an air/fuel ratio.

The method 400 may proceed to 404, which includes determining if an engine-start is requested during cold-start conditions. The engine-start may be requested in response to an ignition key being turned, a button being depressed, and the like. A cold-start may be occurring when an engine temperature is less than a desired operating temperature and/or if a catalyst temperature is less than a light-off temperature. If the cold-start is not occurring, then the method 400 proceeds to 406, which includes maintaining current operating parameters and does not activate the electric heater. If an engine start was requested, then the engine is fueled and receives spark in order to combust.

If the cold-start is occurring, then the method 400 proceeds to 408, which includes not fueling and/or sparking the engine. As such, combustion in the engine is blocked in response to the start request that would generate a cold-start.

The method 400 proceeds to 410, which includes opening the intake and exhaust valves. By opening the intake and the exhaust valves, pumping losses in the engine may be reduced when the engine is cranked.

The method 400 proceeds to 412, which includes cranking the engine. The engine may be cranked via electrical energy supplied from a battery to a starter motor or other device configured to rotate the pistons of the engine. With the intake and exhaust valves open, pumping losses are reduced as gases in the intake system and the exhaust system are displaced via the engine. Said another way, the engine is operated as a pump, thereby oscillating intake gases in the intake system and exhaust gases in the exhaust system. In one example, the intake gases and the exhaust gases are ambient air which may be mixed with residual combustion gases from a previous drive cycle back-filled in the intake and exhaust systems.

The method 400 proceeds to 414, which includes activating an electric heater. The electric heater may be heater to a threshold electric heater temperature. In one example, the threshold electric heater temperature is a fixed temperature, wherein the fixed temperature is greater than 1000° C. Additionally or alternatively, the electric heater may be heated to a temperature in a temperature range, wherein the temperature range is between 600 to 1500° C. In one example, the electric heater is heated to a higher temperature of the temperature range as a difference between a light-off temperature of the first catalyst and a current temperature of the first catalyst increases. The electric heater may be heated to a lower temperature of the temperature range as the difference decreases, which may decrease electrical energy consumption and further decrease emissions.

Additionally or alternatively, the vehicle operator may provide an input regarding a desired rate of a first catalyst warm-up duration. For example, a display device in the vehicle may prompt the vehicle operator to select a rapid first catalyst warm-up duration or a slower first catalyst warm-up duration. The rapid first catalyst warm-up duration may consume a greater amount of electrical energy while heating the first catalyst more quickly than the slower first catalyst warm-up duration, which reduced energy consumption. The vehicle operator may be presented with these options and benefits and select a warm-up type.

The method 400 proceeds to 416, which may include determining if a catalyst temperature is greater than or equal to a threshold temperature. In one example, the threshold temperature is equal to a light-off temperature of the first catalyst. If the catalyst temperature is not greater than or equal to the threshold temperature, then the method 400 proceeds to 418, which includes continuing to electrically heating the catalysts via the electric heater. The method 400 may further comprise continually monitoring the first catalyst temperature based on feedback from the temperature sensor.

If the catalyst temperature is greater than or equal to the catalyst temperature, then the method 400 proceeds to 420, which includes deactivating the electric heater. As such, electrical energy is no longer consumed to power the electric heater.

The method 400 proceeds to 422, which includes fueling and sparking the engine. Engine combustion is initiated and the combustion gases may be treated at the first catalyst.

Turning now to FIG. 5, it shows a graph 500 illustrating an example engine operating sequence of an engine start request when a catalyst temperature is less than a light-off temperature. Plot 510 illustrates if an engine start is requested. Plot 520 illustrates a catalyst temperature and dashed line 522 illustrates a light-off temperature. In one example, the light-off temperature is equal to 300° C. Plot 530 illustrates an exhaust gas flow direction. The exhaust gas may flow in a first direction or in a second direction. The first direction may be from the engine to a tailpipe and the second direction may be from the tailpipe to the engine. Plot 540 illustrates an electric heater activity. Plot 550 illustrates if an engine is fueled. Plot 560 illustrates if the engine is sparked. Time increases from a left to a right side of the figure.

Prior to t1, an engine start is requested (plot 510). During the engine start request, the catalyst temperature (plot 520) is less than a light-off temperature (dashed line 522). The engine is not yet fueled (plot 550) and is not yet sparked (plot 560). The electric heater is not activated (plot 540). There is no exhaust gas flow direction as a force is not applied to the exhaust gas (plot 530).

At t1, the electric heater is activated and the exhaust gas flow direction begins to oscillate between the first direction and the second direction as the engine is cranked. Between t1 and t2, the catalyst temperature increases from a relatively low temperature toward the light-off temperature via gases in the exhaust passage oscillating from the catalyst to the electric heater. That is to say, the exhaust gases may flow through the catalyst and through the electric heater, continuously, which may accelerate warm-up of the catalyst relative to previous examples where the engine is combusted during cranking or where the electric heater directly heats the catalyst. Furthermore, by delaying combustion, emissions are reduced during the cold-start.

At t2, the catalyst temperature is equal to a light-off temperature. As such, the engine is fueled and sparked, resulting in combustion. The electric heater is deactivated as the catalyst temperature is sufficiently high and able to treat a desired amount of emissions. After t2, the catalyst temperature continue to increase as exhaust gases flowing in only the first direction flow therethrough as the engine combusts.

In this way, an electric heater is configured to rapidly heat one or more catalysts arranged in an aftertreatment housing. Gases in an exhaust system are oscillated between the catalysts via an engine being unfueled and not receiving spark. The gases flow across the electric heater and through the one or more catalysts. The technical effect of not combusting the engine during the cold-start as the catalysts are heated is to reduce emissions and block formation of fuel film on surfaces of the combustion chamber. By doing this, the catalyst may be quickly heated and the engine may begin combustion, wherein the catalyst may treat emissions from the engine in an efficient manner.

An embodiment of a method comprises pumping heated air between a first catalyst and a second catalyst in response to an engine start request.

A first example of the method further includes where cranking an engine unfueled in response to the engine start request.

A second example of the method, optionally including the first example, further includes where pumping heated air comprises flowing air back and forth from the first catalyst and the second catalyst, wherein a heating device is arranged between the first catalyst and the second catalyst.

A third example of the method, optionally including one or more of the previous examples, further includes where a first gap is arranged between the first catalyst and the heating device and a second gap is arranged between the second catalyst and the heating device.

A fourth example of the method, optionally including one or more of the previous examples, further includes where supplying electrical energy to the heating device.

A fifth example of the method, optionally including one or more of the previous examples, further includes where sensing a temperature of the first catalyst in response to the engine start request via a temperature sensor prior to pumping heated air, wherein the temperature is less than a threshold temperature.

An embodiment of a system comprises an engine, an aftertreatment device comprising a first catalyst, a second catalyst, and an electric heater arranged in a housing, wherein the electric heater is arranged between the first catalyst and the second catalyst, and a controller comprising computer-readable instructions stored on non-transitory memory thereof that when executed enable the controller to sense a temperature of the first catalyst in response to an engine start request, and crank the engine and activate the electric heater in response to the temperature being less than a threshold temperature.

A first example of the system further includes where the instructions further enable the controller to block spark to the engine when the engine is cranked.

A second example of the system, optionally including the first example, further includes where the instructions further enable the controller to crank the engine unfueled.

A third example of the system, optionally including one or more of the previous examples, further includes where a first gap is arranged between the first catalyst and the electric heater and a second gap is arranged between the second catalyst and the electric heater.

A fourth example of the system, optionally including one or more of the previous examples, further includes where a temperature sensor arranged adjacent to an upstream face of the first catalyst.

A fifth example of the system, optionally including one or more of the previous examples, further includes where the instructions further enable the controller to deactivate the electric heater in response to the temperature being greater than or equal to the threshold temperature.

A sixth example of the system, optionally including one or more of the previous examples, further includes where the instructions further enable the controller to fuel the engine and provide spark to the engine.

A seventh example of the system, optionally including one or more of the previous examples, further includes where the instructions further enable the controller to open intake valves and exhaust valves of the engine when the engine is cranked.

An eighth example of the system, optionally including one or more of the previous examples, further includes where the instructions further enable the controller to provide fuel and spark to the engine in response to the temperature being greater than or equal to the threshold temperature, and wherein the electric heater is not activated in response to the temperature being greater than or equal to the threshold temperature.

An embodiment of a method for operating an engine, comprises rotating the engine with exhaust and intake valves of each engine cylinder open in response to a request to start the engine and activating a heater in an exhaust system in response to the request to start the engine.

A first example of the method further includes where sensing a temperature of a catalyst arranged upstream of the heater relative to a direction of gas flow in the exhaust system being less than a light-off temperature prior to rotating the engine.

A second example of the method, optionally including the first example, further includes where adjusting intake valve and exhaust valve lift to equalize flow oscillations in the exhaust system and an intake system.

A third example of the method, optionally including one or more of the previous examples, further includes where deactivating the heater in response to a temperature of a catalyst being greater than or equal to a light-off temperature.

A fourth example of the method, optionally including one or more of the previous examples, further includes where rotating further comprises rotating the engine unfueled as gases in the exhaust system oscillate between a first catalyst and a second catalyst, wherein the heater is arranged between the first catalyst and the second catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the computer-readable instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
pumping heated air between a first catalyst and a second catalyst in response to an engine cold start request, wherein pumping heated air comprises flowing air back and forth from the first catalyst and the second catalyst;
wherein a heating device is arranged between the first catalyst and the second catalyst; and
wherein a first gap is arranged between the first catalyst and the heating device and a second gap is arranged between the second catalyst and the heating device.

2. The method of claim 1, further comprising cranking an engine unfueled in response to the engine cold start request.

3. The method of claim 1, further comprising supplying electrical energy to the heating device.

4. The method of claim 1, further comprising sensing a temperature of the first catalyst in response to the engine cold start request via a temperature sensor prior to pumping heated air, wherein the temperature is less than a threshold temperature.

5. A system, comprising:
an engine;
an aftertreatment device comprising a first catalyst, a second catalyst, a sensor, and an electric heater arranged in a housing, wherein the electric heater is arranged between the first catalyst and the second catalyst and wherein the sensor is arranged adjacent to an upstream face of the first catalyst; and
a controller comprising computer-readable instructions stored on non-transitory memory thereof that when executed enable the controller to:
sense a temperature of the first catalyst in response to an engine start request;
crank the engine and activate the electric heater in response to the temperature being less than a threshold temperature; and
open all intake valves and exhaust valves of the engine when the engine is cranked;
wherein opening the intake and exhaust valves oscillates intake gases in an intake system and exhaust gases in an exhaust system; and
wherein a first gap is arranged between the first catalyst and the electric heater and a second gap is arranged between the second catalyst and the electric heater.

6. The system of claim 5, wherein the instructions further enable the controller to block spark to the engine when the engine is cranked.

7. The system of claim 5, wherein the instructions further enable the controller to crank the engine unfueled.

8. The system of claim 5, wherein the instructions further enable the controller to deactivate the electric heater in response to the temperature being greater than or equal to the threshold temperature.

9. The system of claim 8, wherein the instructions further enable the controller to fuel the engine and provide spark to the engine.

10. The system of claim 5, wherein the instructions further enable the controller to provide fuel and spark to the engine in response to the temperature being greater than or equal to the threshold temperature, and wherein the electric heater is not activated in response to the temperature being greater than or equal to the threshold temperature.

11. A method for operating an engine, comprising:
rotating the engine with each exhaust valve and intake valve of each engine cylinder open in response to a request to start the engine; and
activating a heater in an exhaust system in response to the request to start the engine;
wherein the heater is arranged between a first catalyst and a second catalyst; and
wherein a first gap is arranged between the first catalyst and the heating device and a second gap is arranged between the second catalyst and the heating device.

12. The method of claim 11, further comprising sensing a temperature of a catalyst arranged upstream of the heater relative to a direction of gas flow in the exhaust system being less than a light-off temperature prior to rotating the engine.

13. The method of claim 11, further comprising adjusting intake valve and exhaust valve lift to equalize flow oscillations in the exhaust system and an intake system.

14. The method of claim 11, further comprising deactivating the heater in response to a temperature of a catalyst being greater than or equal to a light-off temperature.

15. The method of claim 11, wherein rotating further comprises rotating the engine unfueled as gases in the exhaust system oscillate between a first catalyst and a second catalyst, wherein the heater is arranged between the first catalyst and the second catalyst.

* * * * *